United States Patent [19]

Rochelle et al.

[11] Patent Number: 4,858,067
[45] Date of Patent: Aug. 15, 1989

[54] MODULAR ELECTRONIC CONTROL HOUSING ASSEMBLY

[75] Inventors: Gary P. Rochelle, Malibu; Charles R. Lile, Tustin, both of Calif.

[73] Assignee: CRL Electronics, Inc., Orange, Calif.

[21] Appl. No.: 122,123

[22] Filed: Nov. 18, 1987

[51] Int. Cl.$^4$ .............................................. H02B 1/08
[52] U.S. Cl. ................................... 361/331; 248/27.1; 312/223; 361/419; 220/3.94
[58] Field of Search ................ 361/331, 334, 356–359, 361/380, 390, 391, 392, 395, 399, 417, 419, 420, 422; 220/3.8, 3.9, 3.92, 3.94; 312/223, 263; 200/293, 295, 296; 307/140; 174/50, 52.1; 248/27.1

[56] References Cited

U.S. PATENT DOCUMENTS

| | | | |
|---|---|---|---|
| 3,842,320 | 10/1974 | Kiesling | 361/331 |
| 3,895,179 | 7/1975 | Wyatt | 220/3.94 |
| 3,895,268 | 7/1975 | May | 361/331 |
| 3,956,675 | 5/1976 | Bauer | 361/331 |

Primary Examiner—Gerald P. Tolin
Attorney, Agent, or Firm—Christensen, O'Connor, Johnson & Kindness

[57] ABSTRACT

A modular electronic control housing assembly 10 having a housing 32, a removable front plate 36, and a chassis 34 for mounting control components. The housing 32 includes an enclosed top 40, an enclosed back 42, and enclosed sides 44 having flanges 48 projecting therefrom. The chassis 34 includes a base 66, a front wall 68, and flanges 70 projection from the wall 68 having a side flange 72 and outwardly projecting front flanges 74. A plurality of electrical connectors 90 are mounted to the base 66 through openings 92. When the modular spa control assembly 10 is assembled, the front flanges 74 on the chassis 34 are clamped between the front plate 36 and the flanges 48 on the sidewalls 44 of the housing 32, thus supporting the chassis 34 within the housing 32 without requiring an enclosed bottom. The control assembly 10 is quickly disassembled by unplugging the power cord 28 and the plurality of plugs 30, removing the fasteners 38 and the front plate 36, and taking the chassis 34 out of the housing 32.

4 Claims, 4 Drawing Sheets

MODULAR ELECTRONIC CONTROL HOUSING ASSEMBLY

TECHNICAL FIELD

The present invention relates to housing assemblies and, more particularly, to a modular electronic control assembly supported within a housing mounted on a spa water conditioning system.

BACKGROUND

Spa water conditioning systems generally utilize equipment such as jet water pumps, water heaters, and water conditioners to prepare and circulate the spa water. The control components for the water conditioning equipment are generally mounted within control housings attached to the equipment itself or to a supporting frame. Typically, the control housing consists of a removable front plate to which are attached the various control components, including electrical switches and relays, transformers, and other mechanical, hydraulic or pneumatic devices. These control components are generally mounted to the front plate or one of the wall of the housing. In addition, electrical wiring is permanently connected to the electrical components.

The above-described control system has several disadvantages. First, recent changes in certification standards by product testing laboratories prohibit the attachment of electrical components to the front plate of the control housing. This is designed to prevent inadvertent shocking of an individual due to one of the electrical components becoming grounded to the housing or the front plate. Existing control housings cannot meet these new standards. Another disadvantage arises in the increased repair costs due to the amount of time and skill required to disassemble and repair or replace faulty components in the crowded area into which the components are mounted. Increased repair costs also result from the fact that field service calls are frequently required to service the control components. Finally, construction costs are higher with these type of units because of the time required to permanently mount the components and to permanently connect the electrical wiring.

SUMMARY OF THE INVENTION

The present invention overcomes the foregoing and other disadvantages by providing a modular electronic control housing assembly for a spa water conditioning system. The housing assembly comprises a housing having an open front and an open bottom, a front plate removably attached to the housing to cover the open front, and a chassis moutable within the housing. The chassis comprises a base, a front wall depending from the base, and a mounting means preferably in the form of a flange projecting from the front wall, with the flange being configured to be clamped between the housing and the front plate to thereby support the chassis in the housing.

In accordance with another aspect of the present invention, the front plate includes openings to provide access to selected control components mounted on the chassis.

In accordance with yet another aspect of the present invention, the housing assemlby comprises a housing having an enclosed top, enclosed sides, an enclosed back, and an open front and an open bottom, a front plate removably attached ot the housing to cover the open front, and a chassis mountable within the housing. The chassis further comprises a flat base, a front wall depending from the base, and a mounting means in the form of a flange projecting from the wall. The flanges are configured to be clamped between the housing and the front plate to thereby support the chassis in the housing. Mounted to the chassis are control components having quick disconnect means to facilitate quick and easy disconnecting of the control components from the spa water conditioning system and removal of the chassis from the housing.

As will be readily appreciated from the foregoing, the modulator electronic control housing assembly provides a simplified housing having an open front and an open bottom. This configuration achieves a lighter housing and reduces the amount of material required to construct the housing. The mounting of the chassis in the housing b y means of the flanges clamped between the front plate and the housing eliminates the need for an enclosed bottom on which to rest the chassis. This prevents the accumulation of water inside the housing that could potentially result in electrical shorts, injury to individuals, and general corrosion of the housing. The clamping of the chassis between the removable front plate and the housing also gives easy access to fasteners holding the front plate to the housing, thus facilitating quick and easy removal of the front plate and the chassis. In addition, the quick disconnect fittings permits the chassis or individual pieces of equipment to be quickly removed from the water conditioning system and either taken to a repair shop or replaced with another unit. This feature reduces the need for field service calls by trained repairmen, thus reducing the cost to the owner for maintaining, repairing, or updating the control components.

BRIEF DESCRIPTION OF THE DRAWINGS

The foregoing and other advantages and features of the present invention will be better understood from the following description of the preferred embodiment of the invention when taken in conjunction with the following drawings, wherein.

DETAILED DESCRIPTION OF THE PREFERRED EMBODIMENT

Figure 1:
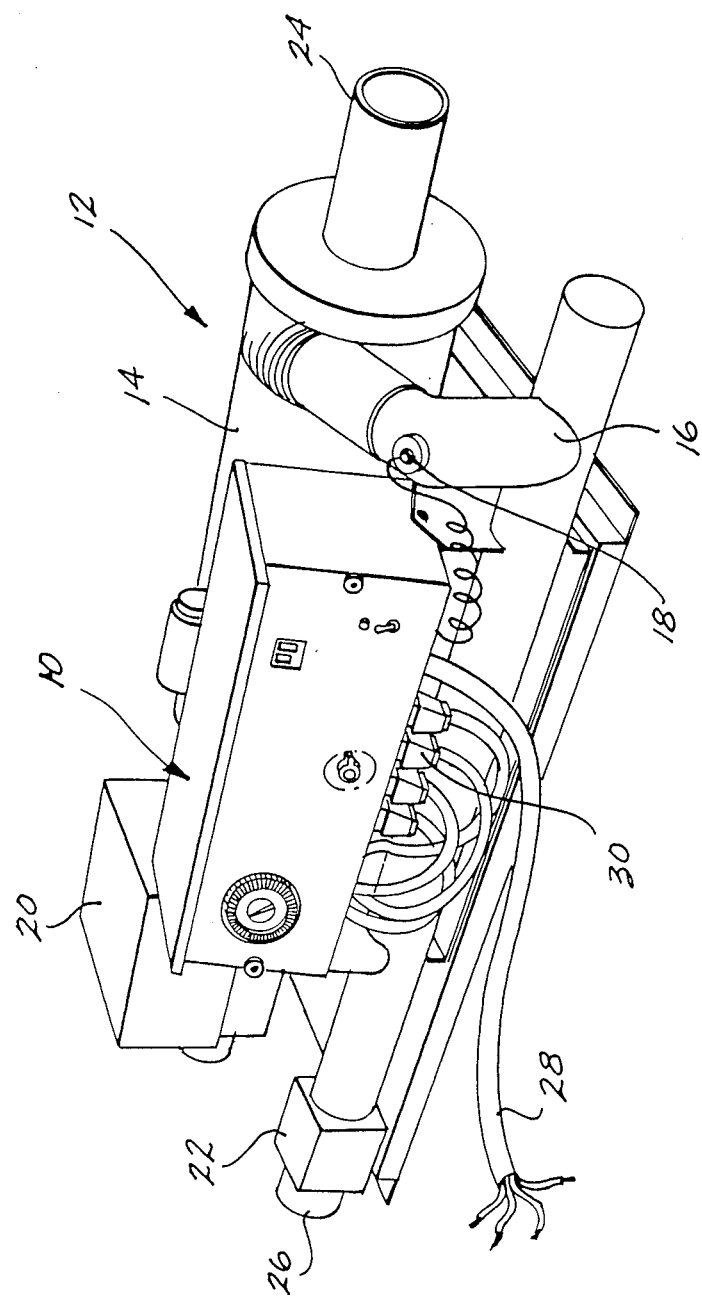
FIG. 1 is an isometric view of the modular electronic control housing assembly installed on a spa water conditioning system formed in accordance with the present invention.

Referring initially to FIG. 1, the modular electronic control housing assembly 10 is shown mounted to a spa water conditioning system 12. Briefly, the equipment in the spa water conditioning system includes a jet pump 14 for circulating water through the spa, a heater 16 located downstream from the jet pump for heating the water as it enters the spa and a thermostat probe 18 inserted into the heater 16 for monitoring the temperature of the water. Further downstream from the heater 16 is a blower 20 that, when activated, injects air bubbles into the spa water for general therapy. A flow switch 22 is located downstream from the heater 16 and acts to shut off the heater 16 when the flow of water ceases. Water is circulated by leaving the spa and entering the water conditioning system 12 through the water inlet 24. After passing through the jet pump 14, the heater 16, and the flow switch 22, the water is circulated into the spa through the water outlet 26. Electrical power is provided to the conditioning system through a power cord 28. Each piece of electrically powered equipment receives power from the control assembly 10 through individual plugs 30 that are plugged into the control assembly 10.

Figure 2:
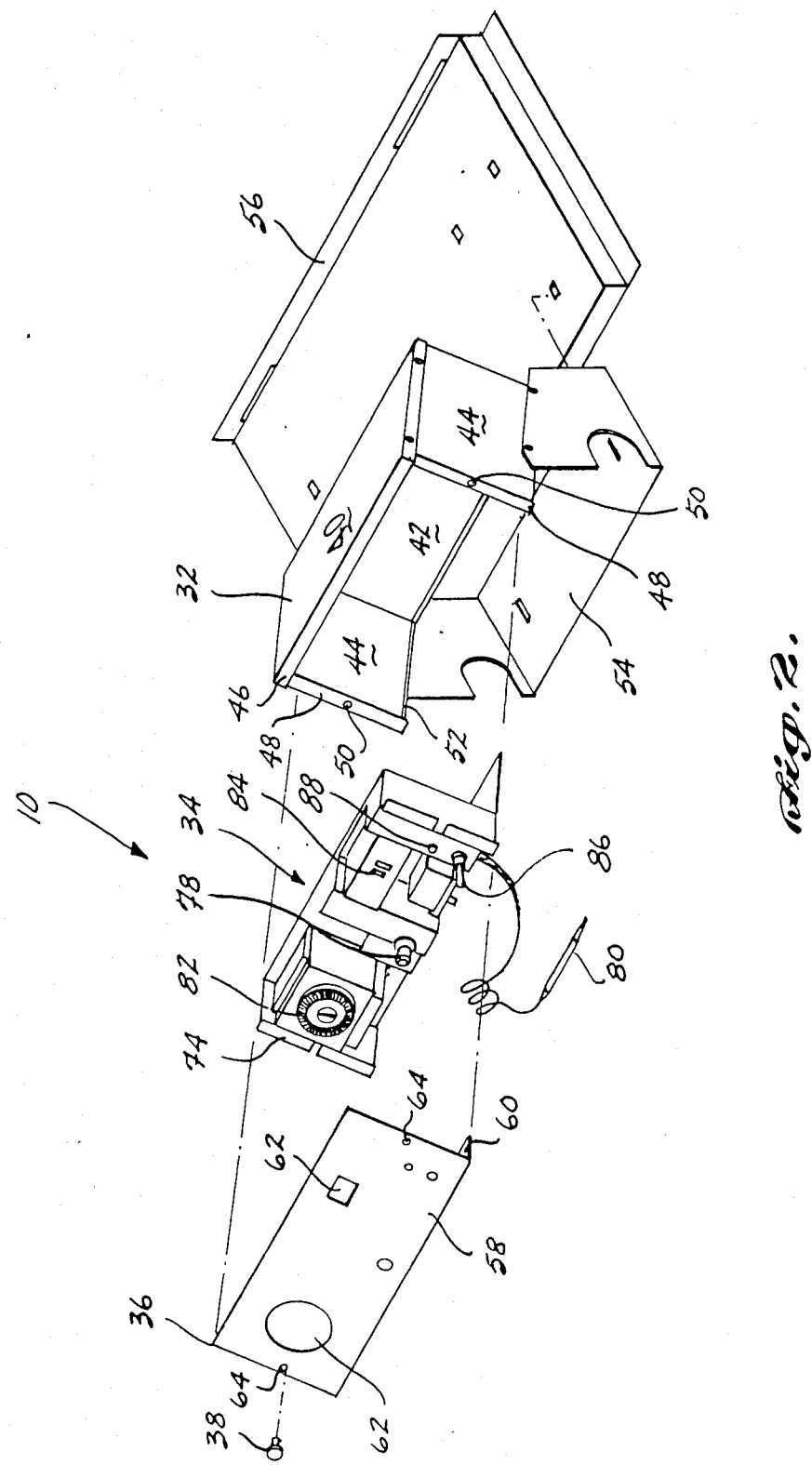
FIG. 2 is an isometric exploded view of the modular electronic control housing assembly of FIG. 1.

As is more clearly shown in FIG. 2, the present invention is directed to a modular electronic control housing assembly 10 comprising a housing 32, a chassis 34 mountable within the housing 32, and a front plate 36 mountable to the housing 32 by two fasteners 38. More particularly, the housing 32 comprises an enclosed top 40, an enclosed back 42, and enclosed sides 44. The front and bottom of the housing 32 have no walls and thus remain open to provide access to the chassis 34. While the housing 32 may be formed of any suitable plastic or metal material, preferably aluminum sheet metal is used. The housing 32 may be formed by bending a single sheet of metal or by separately constructing the top 40, the back 42, and the sidewalls 44. As shown in FIG. 2, the back 42 and the sidewalls 44 are formed from a first sheet of metal and the top 40 is formed from a second sheet of metal. The top 40 may be attached by screws to the back 42 and the sidewalls 44 or by any suitable means, such as welding, riveting, etc.

The top 40 has a downward depending flange 46 around each edge to provide a mounting surface for the walls 44 and the back 42 and to provide a smooth edge. The sidewalls 44 each have a flange 48 projecting inward towards the open front. The flanges 48 are used to provide a mounting surface for the chassis 34 and the front plate 36. Holes 50 in each of the flanges 48 are preferably threaded to receive the fasteners 38. Shown along the bottom of the sidewalls 44 and the back 42 are bottom flanges 52. These bottom flanges 52 are used to provide rigidity to the back 42 and the sidewalls 44. The bottom flanges 52 may be eliminated without affecting the function of the housing 32.

The housing 32 is shown attached to a platform 54 that in turn is affixed to a base 56 to which the equipment for the spa water conditioning system 12 is also mounted. The platform 54 holds the housing 32 such that the front plate 36 is angled to face upward to give easier access to the controls. The front plate 36 is formed of a flat wall 58 and a bottom flange 60 that, when the front plate 36 is mounted to the chassis 32, projects toward the rear wall 42 and partially encloses to open bottom of the chassis 32. The wall 58 includes openings 62 to give access to the control components mounted on the chassis 34. An opening 64 on each side of the front plate 36 allows the fasteners 38 to pass through the front plate 36 and into the openings 50 on the flanges 48 on the housing 32. Ideally, the fasteners 38 are threaded thumbscrews or other similar fasteners that allow tightenng and removal by hand.

Figure 3:
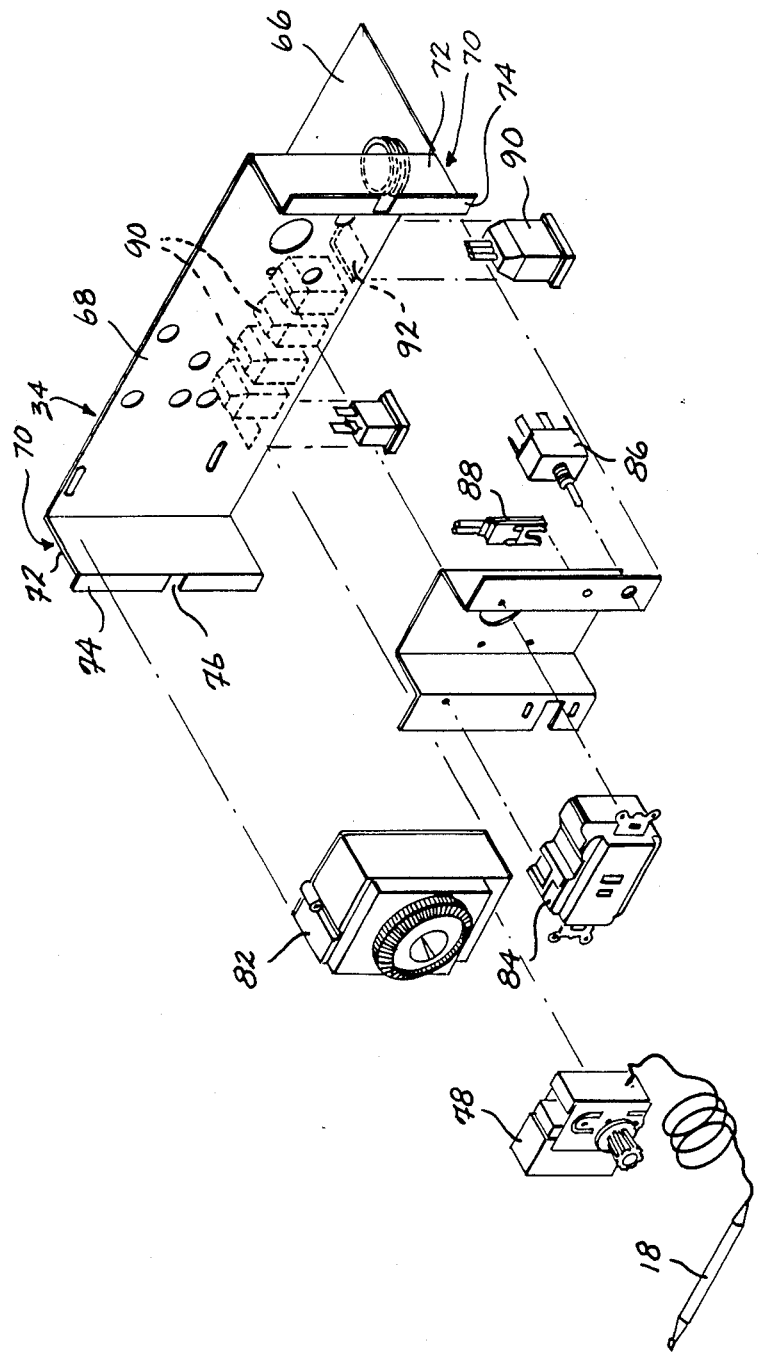
FIG. 3 is an isometric exploded view of the chassis and the control components.

Turning now to the chassis 34, as is more clearly shown in FIG. 3, the chassis 34 comprises a base 66, a wall 68 depending upward from the base 66, and flanges 70 projecting from each side of the wall 68. The flanges 70 consist of a side flange 72 projecting forward from the side of the wall 68 and a front flange 74 projecting outward from the side flange 72. An opening 76 is formed in the front flanges 74 to permit the fastener 38 to pass through the flanges 70. Attached to the chassis 34 are various electrical components, including a thermostat 78 with the thermostat probe 18, a time clock 82, a ground fault circuit interrupter 84, a switch 86 and a light 88. A plurality of receptacles 90 are shown mountable through openings 92 formed in the base 66 of the chassis 34. These receptacles 90 are sized to receive the plugs 30. This permits quick and easy connecting and disconnecting of the various pieces of equipment in the water conditioning system 12. Ideally, each plug 30 has a unique prong pattern to insure each piece of equipment is plugged into the correct receptacle 90.

Figure 4:
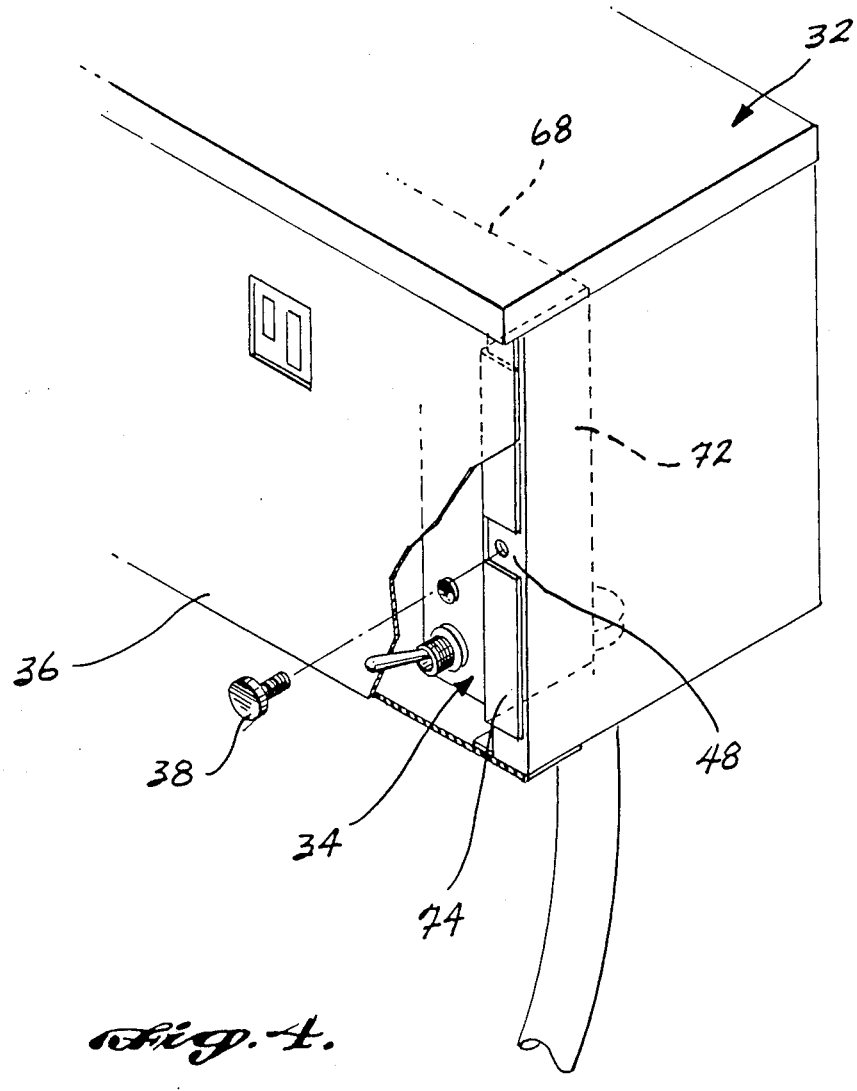
FIG. 4 is an isometric cutaway view of the modular electronic control housing assembly illustrating the chassis clamped between the front plate and the housing.

FIG. 4 shows the chassis 34 mounted within the housing 32. When so assembled the front flanges 74 of the chassis 34 are clamped between the front plate 36 and the flanges 48 on the housing 32. Thus the only contact between the chassis 34 and the housing 32 is where the front flanges 74 on the chassis 34 meet the flanges 48 on the housing 32. With this configuration the chassis 34 is easily removed from the housing 32. First, the electrical components are disconnected by unplugging the power cord 28 from the power source and unplugging the equipment plugs 30 from the receptacles 90 on the control assembly 10. Next the thermostat probe 18 is removed from the housing 32. The control assembly 10 is reassembled by following the above steps in reverse order.

As will be readily appreciated from the foregoing description, the open bottom of the housing provides greater safety in that water inadvertently spilling over onto the control assembly from the spa cannot accumulate within the housing. This will prevent shorting of the electrical euqipment to the housing and possible injury to persons who may happen to touch the control assembly. Another advantage is the quick and easy removal of the chassis 34 from the housing by simply unplugging the power cords and removing the two fasteners, making it easy for owners to disassemble the control assembly for servicing and avoiding the necessity of expensive field service calls. In addition, the particular configuration of the chassis places the control components within the housing so that they project through the openings and the front plate, thus providing access to the controls and meeting modern certification standards of the various testing laboratories.

Although a preferrd embodiment of the present invention has been described in the context of spa water conditioning systems, it is to be understood that the invention can be used in other environments where it is necessary to provide quick and easy removal of a control component chassis and provide a configuration that prevents the accumulation of water or other corrosive elements. Additionally, while the invention has been illustratively described in its preferred form, it is not intended to limit the scope of the claims that follow the specifics of that design form, inasmuch as variations equivalent thereto are feasible without departing from the novel inventive concepts involved. These and other variations are contemplated to fall within the scope of the claims that follow.

The embodiments of the invention in which an exclusive property or privilege is claimed are defined as follows:

1. A modular electronic control housing assembly for a spa water conditioning system, the assembly comprising:
    (a) a housing having an open front and an open bottom;
    (b) a front plate removably attached to said housing to cover said open front of said housing;
    (c) a chassis removably mounted within said housing, said chassis comprising a base, a front wall depending from said base; and
    (d) a plurality of flanges projecting from said wall, each of said flanges comprising a first flange projecting forward from the side of said wall and a second flange projecting outward from said first flange, each of said flanges being clamped between said housing and said front plate to thereby support said chassis in said housing.

2. The assembly of claim 1, wherein said front plate includes openings to provide access to selected control components mounted on said chassis.

3. A modular electronic control housing assembly for a spa water conditioning system, the assembly comprising:
    (a) a housing having an enclosed top, enclosed sides, an enclosed back, and an open front and an open bottom;
    (b) a front plate removably attached to said housing to cover said open front of said housing; and
    (c) a chassis having electrical components mounted thereto, said electrical components having quick disconnect means to facilitate detachment of the electrical components from said spa water conditioning system, said chassis comprising a flat base, a front wall depending from said base; and
    (d) plurality of flanges projecting from said wall, each of said flanges comprising a first flange projecting forward from the side of said wall and a second flange projecting outward from said first flange, each of said flanges being clamped between said housing and said front plate to thereby support said chassis in said housing.

4. The assembly of claim 3, wherein said front plate includes openings to provide access to selected electrical components mounted on said chassis.

* * * * *

UNITED STATES PATENT AND TRADEMARK OFFICE
CERTIFICATE OF CORRECTION

PATENT NO. : 4,858,067

DATED : August 15, 1989

INVENTOR(S) : Gary P. Rochelle et al.

It is certified that error appears in the above-identified patent and that said Letters Patent is hereby corrected as shown below:

| | |
|---|---|
| Abstract, line 8: | "projection" should be --projecting-- |
| Column 1, line 24: | "wall" should be --walls-- |
| Column 1, line 54: | "moutable" should be --mountable-- |
| Column 1, line 66: | "assemlby" should be --assembly-- |
| Column 2, line 1: | "ot" should be --to-- |
| Column 2, line 14: | "modulator" should be --modular-- |
| Column 2, line 19: | "b y" should be --by-- |
| Column 3, line 63: | "tightenng" should be --tightening-- |
| Column 4, line 29: | after "the" insert --heater 16. Finally, the fasteners 38 are unthreaded from the-- |

UNITED STATES PATENT AND TRADEMARK OFFICE
CERTIFICATE OF CORRECTION

PATENT NO. : 4,858,067

DATED : August 15, 1989

INVENTOR(S) : Gary P. Rochelle, et al.

It is certified that error appears in the above-identified patent and that said Letters Patent is hereby corrected as shown below:

Column 4, line 29: after "32." insert -- At this point the front plate 36 easily slips off and the chassis 34 is simply removed from the housing 32.--

Column 4, line 37: "euqipment" should be --equipment--

Column 4, line 50: "preferrd" should be --preferred--

Column 6, line 15: after "(d)" insert --a--

Signed and Sealed this

Seventeenth Day of April, 1990

Attest:

HARRY F. MANBECK, JR.

*Attesting Officer*　　　　*Commissioner of Patents and Trademarks*